United States Patent
Fortner

[15] 3,675,751
[45] July 11, 1972

[54] TORQUE OR MOTION RESPONSIVE APPARATUS

[72] Inventor: William D. Fortner, Cypress, Calif.
[73] Assignee: The Cavins Co., Long Beach, Calif.
[22] Filed: Oct. 20, 1970
[21] Appl. No.: 82,356

[52] U.S. Cl............................192/150, 192/141, 200/47, 251/134, 318/469
[51] Int. Cl..................F16d 71/00, F16k 31/04, H01h 3/16
[58] Field of Search............192/141, 150; 251/134; 200/47; 318/469

[56] References Cited

UNITED STATES PATENTS

| 3,480,746 | 11/1969 | Fry | 192/150 X |
| 1,764,936 | 6/1930 | Dean | 192/150 |
| 2,144,322 | 1/1939 | Benson | 192/150 X |
| 2,151,493 | 3/1939 | Acker | 192/150 |
| 3,209,090 | 9/1965 | Fry | 192/141 X |

Primary Examiner—Allan D. Herrmann
Attorney—William P. Green

[57] ABSTRACT

A device adapted to respond to the application of excessive torque or excessive movement of a part, and including a shaft which upon excessive rotary movement in opposite directions will displace a cam which actuates electrical switches for controlling a motor or the like. The shaft carries two cam drivers which are adjustable rotatively relative to the shaft to vary the extent of shaft movement required for actuation of the cam.

11 Claims, 8 Drawing Figures

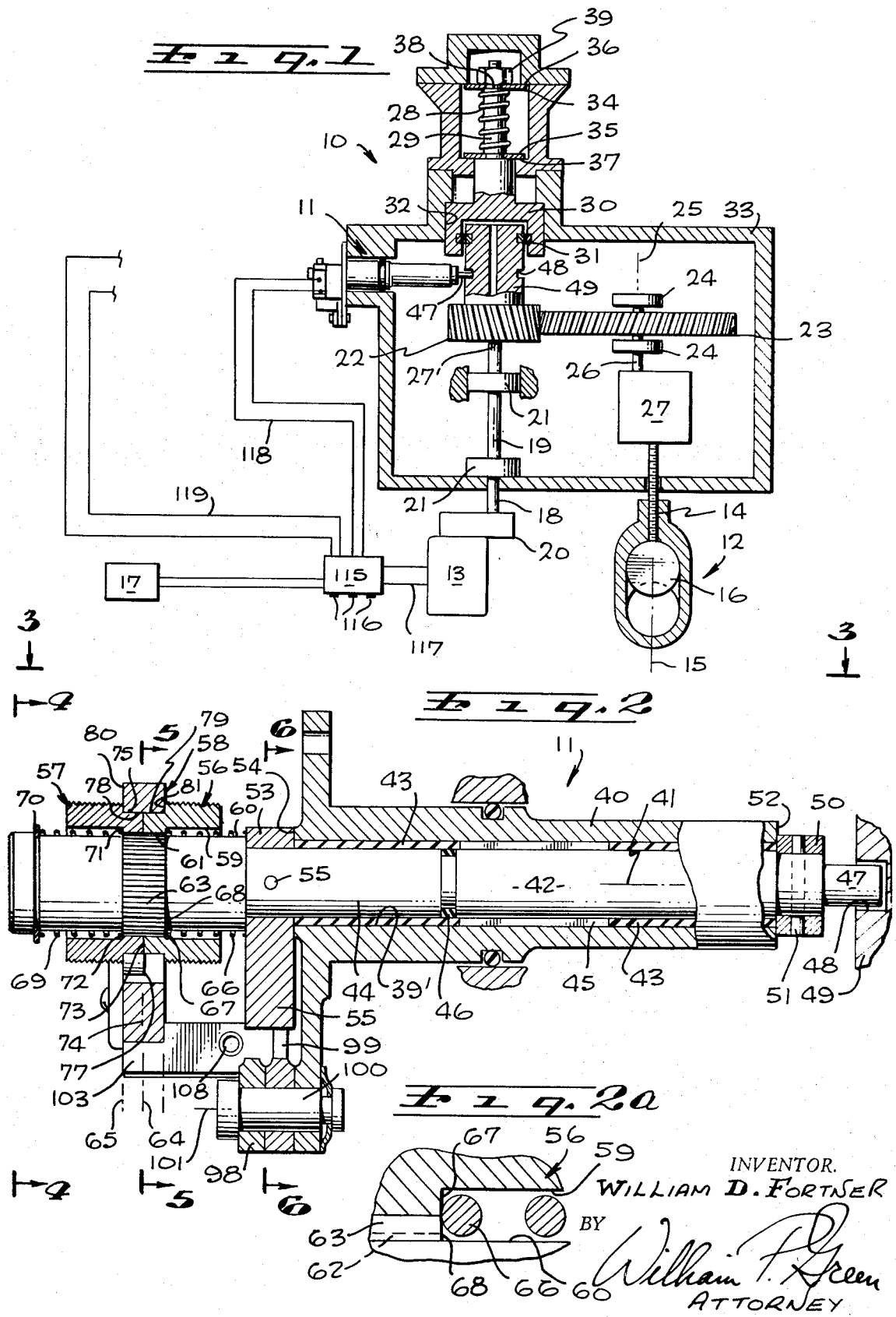

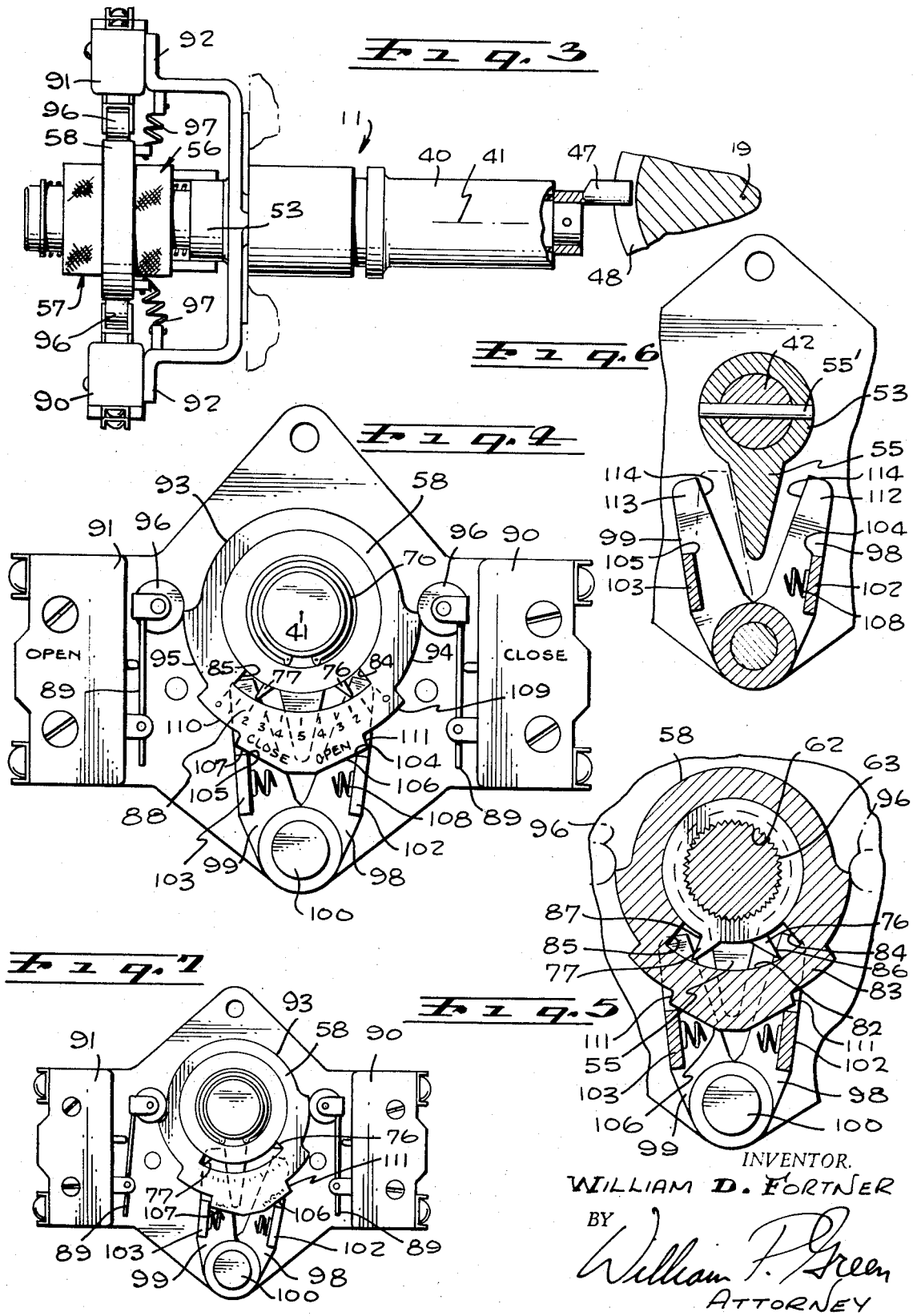

3,675,751

TORQUE OR MOTION RESPONSIVE APPARATUS

BACKGROUND OF THE INVENTION

This invention relates to improved apparatus for responding to the application of excessive torque in a piece of controlled equipment, such as a mechanized valve actuator, or for responding to or limiting movement of a controlled part, or for performing other control or response operations. To clarify and simplify the disclosure, the invention will be described primarily as applied to a torque limiting device for a valve actuator, though this specific description of a preferred embodiment is not to be taken as limiting the invention to such use.

In a motor operated device for actuating a valve between open and closed conditions, it is desirable to provide some means for de-energizing the motor in the event of obstruction or binding of the valve in a manner introducing an excessive resistance which might otherwise damage the motor or other parts of the equipment. Various types of torque responsive devices have been proposed for this purpose in the past, but each of those with which I am familiar has had certain disadvantages. For example, many of the prior devices have been relatively difficult to reset to different response values, have required the use of tools in changing their settings, and have been subject to an unwanted alteration of the setting as a result of vibration encountered in use. Further, these prior units have been more complex than would be desired, and have therefore been unduly expensive to manufacture and maintain.

SUMMARY OF THE INVENTION

A torque or motion responsive unit embodying the present invention can be structurally very simple and inexpensive to manufacture and yet very positive and permanently reliable in its functioning. The device can be easily reset to any desired torque or motion limiting setting without the use of any tools whatever, preferably by merely displacing manually to a retracted position a spring pressed control element, turning the element to a changed setting, and then allowing its spring urged return to an active position. The setting for each of two opposite directions of motion of the controlled part may be controlled separately to allow different settings for the two directions of movement. Further, after the unit has responded to excessive torque or motion in one direction, to halt further motion in that direction, a deflected part of the device may be latched automatically in an actuated condition preventing resumption of the halted motion, but at the same time permitting energization of the motor for actuation of the equipment in a reverse direction. Additionally, such reverse actuation may then function to release the initial latched condition and permit subsequent energization in either of the two opposite directions.

Structurally, a device embodying the invention includes a shaft or other part mounted to turn about a predetermined axis and capable of displacing a controlled part such as a cam about that axis after predetermined limited lost motion of the shaft. The extent of movement required before actuation of the cam or its equivalent is controllable by rotary adjustment of a cam driver, which may be shiftable axially to a retracted position in which it can be turned to a new setting. The driver may be spring urged toward its active position, and may have serrations or splines interfitting with the shaft in that position. Desirably, two such drivers are provided for actuating the cam or its equivalent in opposite directions, and two separate latch parts may coact with the cam for holding it in its two actuated settings. The switches or other similar elements controlled by the cam may respond to its rotary movement to effect proper motor controlling functions or the like in response to excessive shaft movements.

BRIEF DESCRIPTION OF THE DRAWING

The above and other features and objects of the invention will be better understood from the following detailed description of the typical embodiment illustrated in the accompanying drawing, in which:

FIG. 1 is a partially diagrammatic vertical section through a valve actuating system having a torque limiting switch assembly embodying the invention;

FIG. 2 is an enlarged axial section through the torque limiting switch of FIG. 1;

FIG. 2a is a further enlargement of a portion of FIG. 2;

FIG. 3 is a plan view of the torque switch assembly taken on line 3—3 of FIG. 2;

FIG. 4 is a front elevational view taken on line 4—4 of FIG. 2;

FIGS. 5 and 6 are transverse sections taken on lines 5—5 and 6—6 respectively of FIG. 2; and, FIG. 7 is a view similar to FIG. 4, but showing the cam in a latched condition.

DESCRIPTION OF THE PREFERRED EMBODIMENT

Referring first to FIG. 1, I have illustrated at 10 in that figure an arrangement in which an automatic control unit 11 embodying the invention is employed typically as a torque limiting switch in mechanism for power actuating a conventional gate valve 12 or other operated unit by means of an electric motor represented at 13. The valve 12 may have the usual threaded stem 14 which turns about the axis 15 of the valve and acts by that rotation to move the gate valve element 16 between fully opened and fully closed positions. Motor 13 is energized by current from a powder source represented at 17 and acts to drive a shaft 18 rotatively about an axis 19 typically parallel to axis 15. Motor 13 may drive the shaft 18 through a reduction gear assembly represented at 20, with the shaft 18 being journalled for rotation by suitable bearings 21.

Shaft 18 in turn drives rotatively about axis 19 a helical gear 22, which meshes with a second helical gear 23 journalled by bearings 24 for rotation about a third axis 25 disposed parallel to the previously mentioned axes 15 and 19. Bearings 24 are of the thrust bearing type acting to positively retain gear 23 against axial movement, while journalling it for the desired rotary movement. The shaft 26 of gear 23 drives the actuating stem 14 of valve 12 rotatively through an appropriate reduction gear assembly represented at 27, to open and close the valve.

In order to enable response by unit 11 to the application of excessive torque to stem 14 of valve 12, resulting from blockage of the valve, binding, or any other cause producing increased resistance to motion of valve element 16, the helical gear 22 is not mounted rigidly to its driving shaft 18, but rather is splined to the shaft at 27' to transmit rotation from the shaft to gear 22 while permitting relative axial movement of the latter. Such axial movement of gear 22 is resisted in both axial directions by a coil spring 28, which is disposed about the acts against a projection 29 of an element 30 which is connected to gear 22 for axial but not rotative movement therewith by a thrust bearing assembly 31. Element 30 does not turn with gear 22, and is guided for movement along axis 19 by reception within a guideway 32 formed by the gear box housing 33. Spring 28 bears at its opposite ends against two annular rings 34 and 35, which are engaged by shoulders 36 and 37 of the gear box in a manner maintaining the spring under compression, and which are also engaged by a shoulder 38 and a nut 39 on portion 29 of element 30.

Because of the helical configuration of the teeth on gears 22 and 23, the application of torque to gear 22 tends to move that gear upwardly or downwardly in FIG. 1. Downward movement causes nut 39 to displace ring 34 downwardly away from shoulder 36, but against the resistance of spring 28, and similarly upward movement of gear 22 (resulting from the application of torque in the opposite direction to gear 22) requires upward displacement of ring 35 away from shoulder 37 against the resistance of spring 28.

The automatic control unit 11 embodying the present invention is utilized in the valve control apparatus typically illustrated in FIG. 1 as a torque limiting unit responsive to axial movement of the previously described helical gear 22 in either axial direction. As seen best in FIG. 2, this unit includes a main shaft 42 which is mounted within a support body 40 connected to gear case 33 for rotation about a horizontal axis 41 disposed generally perpendicular to but slightly offset from axis 19 (See FIG. 3). More particularly, body 40 may have a cylindrical passageway 39', containing a pair of bushing sleeves 43 within which cylindrical portions 44 and 45 of the shaft are journalled for their desired rotary movement about axis 41. A seal ring 46 may be provided within a groove in shaft 42 to prevent leakage of lubricant or other fluids into and out of the gear housing. At its inner end, shaft 42 rigidly carries an actuating lug 47 which projects from the shaft parallel to its axis 41 but at a location offset laterally from the axis (See FIG. 3), and is received within an annular groove 48 formed in the upwardly projecting portion 49 of gear 22, to cause limited turning movement of shaft 42 about axis 41 in response to torque induced upward and downward movement of gear 22. The projection or lug 47 may be connected to shaft 42 in any suitable manner, as by forming projection 47 integrally with a ring 50 disposed about a reduced diameter portion of the shaft and secured thereto by a crosspin 51. This ring 50 may serve to retain shaft 42 against axial movement in a first direction, by engagement with an end surface 52 of body part 40, while axial movement in the opposite direction may be prevented by engagement of a latch releasing part 53 with an opposite end surface 54 on the body part 40. This latch releasing part 53 may be secured to the shaft in a manner similar to ring 50, and specifically by a crosspin 55' extending through openings in the shaft and in part 53, so that part 53 is fixed to and turns with shaft 42. As seen best in FIG. 6, part 53 is annular about shaft 42 except for the provision at its underside of a downwardly projecting finger 55 for serving a later-to-be-discussed latching function.

Axially beyond part 53, there are provided about shaft 42 two adjustable externally knurled cam driving rings 56 and 57 about which there is disposed and mounted a cam element 58. The first cam driver 56 has an internally cylindrical surface 59 of a diameter slightly greater than the corresponding portion 60 of shaft 42, and has between the two transverse planes 61 and 64 a large number of axially extending identical serrations or splines 62 centered about axis 41 and engageable in interfitting relation with a corresponding series of identical axially extending serrations or splines 63 formed on the outer surface of shaft 42 between the planes 61 and 65 of FIG. 2. A coil spring 66 disposed about the shaft and within cam driver 56 bears at one end against part 53 and at its opposite end against an annular shoulder 67 within driver 56 to yieldingly urge the driver leftwardly in FIG. 2 and to the position of that figure. This axial movement of driver 56 is limited in the FIG. 2 position by engagement of spring 66 with a transverse shoulder 68 formed at and by the ends of the serrations 63 on the shaft.

The second cam driver 57 is identical with driver 56 but reversed to face in an opposite axial direction, and is yieldingly urged to the position of FIG. 2 by a second coil spring 69 bearing at one end against a ring 70 carried by the shaft and at its opposite end against a shoulder 71 in driver 57. This second end of the spring is also engageable with a shoulder formed at 72 on the shaft at the left end of the serrations to limit axial movement of cam driver 57.

The two cam drivers 56 and 57 have surfaces disposed transversely of axis 41 and meeting one another at 73 in the transverse plane designated 64 in FIG. 2. Cam 58 is carried about drivers 56 and 57 for turning movement relative thereto about axis 41. To thus mount the cam, the two cam drivers have complementary substantially annular recesses forming together a groove 75 which is annular except that the location of two cam actuating lugs 76 and 77 carried by the two drivers respectively. The cam is generally annular and disposed about drivers 56 and 57, and as seen best in the upper portion of FIG. 2 is shaped to fit closely in confined relation within the composite groove 75 formed by the two adjacent recesses in drivers 56 and 57. More specifically, the inner surface 78 of the cam may be of straight cylindrical configuration about axis 41 for rotatively engaging correspondingly straight cylindrical outer surfaces 79 of the drivers, and with transverse opposite side faces 80 of the cam engaging confined by corresponding transverse surfaces 81 formed on the drivers.

At the underside of the shaft and drivers 56 and 57, cam 58 is cut away to form an arcuate slot or opening 82 defined by an increased diameter partial cylindrical surface 83 and two radially extending end shoulders 84 and 85. The two previously mentioned lugs or projections 76 and 77 of the drivers 56 and 57 project into slot 82, and have radial shoulder surfaces 86 and 87 which are engageable with shoulders 84 and 85 to turn cam 58 in response to rotation of the drivers and the shaft. Lugs 67 and 77 are visible from the front of the device, as seen in FIG. 4, and are shaped to form pointers coacting with an arcuate series of numbers or other markings 88 formed on the front face of the cam. These markings may be considered as divided into two groups, one of which is associated with the word "Close" while the other is associated with the word "Open," to indicate the torque setting for which the device is set in valve closing and opening directions respectively.

Externally, the cam is shaped to actuate the control arms 89 of two motor controlling microswitches 90 and 91, which may be mounted to two forwardly projecting flanges or arms 92 of the body element 40. The outer surface of the cam has a first partial cylindrical portion 93 extending through substantially 180 degrees at the upper side of the cam, and disposed at a diameter relative to axis 41 less than the diameter of two arcuate partial cylindrical surfaces 94 and 95 on the cam. In the normal FIG. 4 condition of the device, the cam follower rollers 96 of the two microswitches are in engagement with the uppermost extremities of the two larger diameter cam surfaces 94 and 95, in which condition switches 90 and 91 are closed, to enable energization of motor 13. Slight turning movement of the cam about axis 41 in either direction from the FIG. 4 position allows one of the two rollers 96 to move radially inwardly into engagement with the reduced diameter surface 93 of the cam, to thereby open the corresponding microswitch and break the circuit to the motor in one of its directions. The cam is normally yieldingly retained in the FIG. 4 setting by an appropriate spring or springs, such as the two tensioned coil springs 97 (FIG. 3) which are connected at first ends to lugs formed on the back side of the cam, and at second ends to lugs projecting from flanges 92 of element 40. Turning movement of the cam in either direction requires increased extension of both of the springs 97, so that the springs will always tend to retract the cam to the desired FIG. 4 setting.

The cam is adapted to be releasably latched in a rotatively actuated position, such as that shown in FIG. 7 or the reverse thereof, by two latch elements 98 and 99 which are mounted by a pin 100 to swing about the axis 101 disposed parallel to the previously mentioned axis 41. Elements 98 and 99 have forwardly projecting generally parallel laterally spaced cam engaging arms 102 and 103, typically having the rectangular cross-sectional configuration illustrated in FIG. 6. The upper corners 104 and 105 of these arms 102 and 103 extend parallel to the axes 41 and 101, and are normally engaged with two surfaces 106 and 107 formed on the cam. Surface 106 is shaped to advance gradually and progressively radially inwardly toward axis 41 as it advances rightwardly in FIG. 4, and similarly surface 107 is shaped to advance gradually toward axis 41 as it advances leftwardly in FIG. 4. A coil spring 108 extends between and is connected at its opposite ends to the arms 102 and 103, and is maintained under tension to yieldingly urge those arms toward one another and against surfaces 106 and 107 in the normal FIG. 4 position of the apparatus. Upon slight turning movement of cam 58 in either direction from the FIG. 4 setting, one of the two surfaces 106 and 107 moves out of engagement with the corresponding arm 102 or 103, and allows that arm to move toward the other of the two arms under the influence of spring 108, and radially inwardly toward axis 41, into a reduced diameter cutaway portion or recess 109 or 110 formed in the periphery of the cam, to engage a generally radial sidewall 111 of that recess in a manner latching the cam against returning movement from a position such as that shown in FIG. 7 (or the reverse position) to the normal FIG. 4 setting. The tension of spring 108 is made sufficient to thus retain the cam in its deflected setting against the lighter tension offered by the cam returning springs 97.

In addition to their latching arms 102 and 103, the elements 98 and 99 also have upwardly projecting latch releasing arms 112 and 113, lying in the plane of latch release element 53 (See FIG. 6), and having upwardly flaring inner edges 114 which in FIG. 4 are spaced from the downwardly converging opposite side edges of portion 55 of element 53, but are engageable by element 53 under certain circumstances to return an actuated one of the latch elements 98 or 99 to its normal FIG. 4 setting.

For controlling the operation of motor 13, there may be provided a conventional push-button type controller 115 (FIG. 1), having push button switches 116 which respectively energize the motor in a direction to "open" valve 12, energize the motor in a reverse direction to "close" the valve, and deenergize the motor completely to "stop" it in any desired setting. Microswitches 90 and 91 are connected into the "close" and "open" circuits respectively to motor 13 in a relation to break their respective circuits upon torque induced actuation of cam 58.

To now describe a cycle of operation of the illustrated apparatus, assume first of all that the valve 12 is initially in a closed condition, and that the torque limiting control assembly 11 is in the normal condition illustrated in FIG. 4. In order to predetermine the amount of torque to which the apparatus will respond, the cam drivers 56 and 57 are set to positions in which their lugs 76 and 77 point to the desired torque settings on scale 88. To thus set driver 56, an operator merely grasps the knurled right hand portion of that driver as viewed in FIG. 2, pulls the driver rightwardly against the tendency of spring 66 out of cam 58 and far enough to move the internal splines or serrations 62 of driver 56 out of engagement with the mating splines or serrations 63 on the outer surface of shaft 42, so that driver 56 may then be turned relative to the shaft 42 and cam 58 to a setting in which its pointer 76 is aligned with a desired maximum "opening" torque setting (a torque of approximately "2" units in FIG. 4). To allow such turning of the driver, the external cylindrical surface 60 on shaft 42 is made at least as small in diameter as the minor diameter portions of splines 62. The driver 56 in the desired rotary setting is then allowed to return leftwardly in FIG. 2 under the influence of spring 66, to rotatively interlock the driver with shaft 42 in the changed torque setting. The second driver 57 is set in a similar manner, being pulled leftwardly out of engagement with the serrations of the shaft, and then being turned to a proper setting and allowed to return rightwardly into interfitting engagement with the shaft in that changed setting in which its pointer 77 indicates a desired maximum "closing" torque to be applied to valve 12.

With the drivers thus set, an operator may press the "Open" button 116 to energize motor 13 for opening the valve. The torque applied to the valve through gears 22 and 23 will cause gear 22 to shift axially a distance corresponding to the amount of torque applied. This shifting movement of gear 22 causes corresponding turning movement of shaft 42 about its axis, and resultant turning of the two drivers 56 and 57 in a counter-clock-wise direction as seen in FIG. 4. Thus, the shoulder surface 86 at the right side of pointer 76 moves toward shoulder 84 on the cam. If the torque reaches the value for which the pointer 76 has been set, surface 86 engages surface 84 to thereafter cause counter-clock-wise turning movement of the cam 58 with the shaft and drivers 56 and 57. This turning movement of the cam causes the left hand microswitch 91 to be actuated in a manner opening the circuit to the motor and preventing further actuation of the valve. At the same time, arm 103 of latching element 99 moves into the reduced diameter cutaway or recess 110 of the cam, (See FIG. 7), to block returning movement of the cam toward the FIG. 4 setting. As the cam moves toward its latched condition, binding of arm 103 on surface 107 is prevented by the previously discussed shaping of surface 107 to advance progressively toward axis 41 as it advances leftwardly.

After the motor has been automatically deenergized in the above discussed manner, gear 22 will be returned by its spring 28 to its normal setting, the shaft 39 will thus return rotatively to its normal setting, with the two carried drivers 56 and 57, but the cam 58 will be retained by latch arm 103 in its circularly displaced setting (such as that shown in FIG. 7). It is noted that in this condition, the returning movement of latch resetting part 53 to its normal centered downwardly projecting no torque position of FIG. 6 is not sufficient to cause that part to engage the actuated latching element 98 or 99 and return it to its released FIG. 4 setting (See broken line latching position of element 99 in FIG. 6). Though the valve cannot be further opened, the circuitry for energizing the motor to close the valve can still function, because of the fact that the second microswitch 90 is still in its closed condition. Consequently, an operator may press the "Close" push button 116, and thereby energize motor 13 through microswitch 90 to cause closing movement of valve 12. This actuation of the motor will cause a reverse movement of gear 22 and thereby a reverse rotation of shaft 42 and the carried parts, with the result that the downwardly projecting portion of cam release element 53 now engages the edge 114 of latch element 99 (in its broken line FIG. 6 position) to displace it leftwardly to a released condition allowing return of cam element 58 of the FIG. 4 setting under the influence of springs 97. The apparatus is then in condition for further energization of the motor in either direction. If the torque required in a closing direction is excessive, surface 87 of pointer 77 will move into engagement with surface 85 of the cam and displace it in a clockwise direction in FIG. 4, to open microswitch 90 and halt the closing energization, while arm 102 engages the right side of the lower portion of the cam to latch it in a second deflected condition, all in a manner which is analogous to and will be apparent from the above detailed discussion of the cam actuation and latching on valve opening movement.

Whenever it is desired to change the torque limit settings of the device 11, this may be done easily and quickly by resetting of the cam drivers 56 and/or 57 in the manner previously discussed, and without the necessity for use of tools of any type.

While the unit 11 has been discussed as applied to a torque limiting arrangement, and is especially useful in certain respects for that purpose, it will be apparent that similar apparatus embodying the invention can be employed as a travel limiting device, or for other analogous motion limiting or motion responsive or controlling purposes. The invention is not to be treated as limited to the particular arrangement shown and described herein, but rather contemplates any of numerous possible variations so long as they fall within the scope of the appended claims.

I claim:

1. A device comprising a member mounted to turn about an axis, a cam mounted to be turned about said axis by said member but with lost motion, control means actuable by said cam upon predetermined turning movement thereof to produce an output signal, two drivers mounted to turn about said axis and operable to transmit rotary motion from said member to said cam in opposite directions respectively, each of said drivers being constructed to permit initial rotary lost motion of said member without driving said cam and to then turn the cam with the member after said lost motion, interfitting spline means on each of said drivers and said member operable to key each driver and said member together rotatively in different relative angular positions and movable out of interfitting relation by axial retraction of the driver relative to said member and in a direction axially away from the other driver, to a position in which said retracted driver may be adjusted rotatively to a changed relative setting altering the extent of said lost motion for that driver, and spring means yieldingly urging said drivers axially toward one another and to active positions thereof.

2. A device comprising a member mounted to turn about an axis, a cam mounted to be turned about said axis by said member but with lost motion, control means actuable by said cam upon predetermined turning movement thereof to produce an output signal, a driver mounted to turn about said axis and operable to transmit rotary motion from said member to said cam, said driver being constructed to permit initial rotary lost motion of said member without driving said cam to then turn the cam with the member after said lost motion, said driver being adjustable in a relation varying the angular extent of said lost motion of said member before actuation of said cam, means for latching said cam in said deflected position, and means for releasing said latching means in response to reverse turning movement of said member.

3. A device comprising a member mounted to turn about an axis, a cam mounted to be turned about said axis by said member but with lost motion, control means actuable by said cam upon predetermined turning movement thereof to produce an output signal, two drivers mounted to turn about said axis and operable to transmit rotary motion from said member to said cam in opposite directions respectively, each of said drivers being constructed to permit initial rotary lost motion of said member without driving said cam and to then turn the cam with the member after said lost motion, said drivers being separately adjustable to vary the angular extent of the lost motion thereof, means for releasably latching said cam in each of two oppositely rotatively deflected positions, said means for releasing said latching means and thereby said cam from either of said deflected positions in response to reverse turning movement of said member.

4. A device comprising a member mounted to turn about an axis, a cam mounted to be turned about said axis by said member but with lost motion, control means actuable by said cam upon predetermined turning movement thereof to produce an output signal, two drivers mounted to turn about said axis and operable to transmit rotary motion from said member to said cam in opposite directions respectively, each of said drivers being constructed to permit initial rotary lost motion of said member without driving said cam and to then turn the cam with the member after said lost motion, said drivers being separately adjustable to vary the angular extent of the lost motion thereof, and two latch elements yieldingly urged toward one another and against opposite sides of said cam and engageable with two shoulders respectively on the cam in a relation latching the cam in each of two oppositely rotatively deflected positions.

5. A device as recited in claim 4, including a releasing element turning with said member and operable to release said latch elements in response to reverse turning movement of said member, and spring means yieldingly urging said cam rotatively to a predetermined normal position.

6. A device comprising a member mounted to turn about an axis, a structure mounted to be moved by said member but with lost motion, control means actuable by said structure upon predetermined movement thereof to produce an output signal, a driver mounted to turn about said axis and operable to transmit motion from said member to said structure, said driver being constructed to permit initial rotary lost motion of said member without driving said structure and to then move the structure with the member to a deflected position after said lost motion, means for latching said structure in said deflected position, and means for releasing said latching means in response to reverse rotary movement of said member.

7. A device comprising a member mounted to turn about an axis, a structure mounted to be moved by said member but with lost motion, control means actuable by said structure upon predetermined movement thereof to produce an output signal, two drivers mounted to turn about said axis and operable to transmit motion from said member to said structure in opposite directions respectively, each of said drivers being constructed to permit initial rotary lost motion of said member without driving said structure and to then move the structure with the member to a deflected position after said lost motion, means for latching said structure in said deflected position, said latching means being operable to releasably retain said structure in either of two oppositely rotatively deflected positions, means yieldingly urging said structure to an intermediate normal position, and means for releasing said latching means and said structure from either of said deflected positions by reverse movement of said member.

8. A device as recited in claim 7, in which said latching means include two latch elements spring urged toward one another and against opposite sides of said structure and engageable with shoulders on said structure in latching relation.

9. A device as recited in claim 8, in which said releasing means include a releasing part mounted to turn with said member and adapted to engage one of said latch elements and deflect it away from the other latch element.

10. A device comprising a member mounted to turn about an axis, two drivers mounted about said member to turn therewith, a structure disposed about said drivers and adapted to be turned thereby but with lost motion, control means actuable by said structure to produce an output signal upon predetermined turning movement of said structure, and complementary bearing surfaces on said two drivers engaging different portions respectively of said structure and mounting the latter for turning movement about said axis relative to said drivers, said two drivers being separately rotatively adjustable relative to said member.

11. A device comprising a member mounted to turn about an axis, a structure mounted to be moved by said member but with lost motion, control means actuable by said structure upon predetermined movement thereof to produce an output signal, two drivers disposed about said member and mounted to turn about said axis and operable to transmit motion from said member to said structure in opposite directions respectively, each of said drivers being constructed to permit initial rotary lost motion of said member without driving said structure and to then move the structure with the member to a deflected position after said lost motion, interfitting means on each of said drivers and said member operable to key each driver to said member rotatively in different relative angular positions, said interfitting means being movable out of interfitting relation by axial retraction of each driver relative to said member to a position in which said driver may be adjusted rotatively to a changed relative setting altering the extent of said lost motion, and spring means urging said drivers toward one another to active positions interfitting with said member.

* * * * *